(12) United States Patent
Clark

(10) Patent No.: US 10,491,413 B2
(45) Date of Patent: Nov. 26, 2019

(54) SECURE PROCESSING OF CONFIDENTIAL INFORMATION ON A NETWORK

(71) Applicant: Jonathan A. Clark, San Jose, CA (US)

(72) Inventor: Jonathan A. Clark, San Jose, CA (US)

( * ) Notice: Subject to any disclaimer, the term of this patent is extended or adjusted under 35 U.S.C. 154(b) by 503 days.

(21) Appl. No.: 13/623,868

(22) Filed: Sep. 20, 2012

(65) Prior Publication Data

US 2013/0077773 A1 Mar. 28, 2013

Related U.S. Application Data

(60) Provisional application No. 61/536,675, filed on Sep. 20, 2011.

(51) Int. Cl.
| | |
|---|---|
| H04M 1/64 | (2006.01) |
| H04L 12/22 | (2006.01) |
| H04L 29/06 | (2006.01) |
| H04L 27/30 | (2006.01) |

(52) U.S. Cl.
CPC ............. *H04L 12/22* (2013.01); *H04L 27/30* (2013.01); *H04L 63/0428* (2013.01); *H04L 65/1069* (2013.01); *H04M 2203/6009* (2013.01); *H04M 2203/609* (2013.01)

(58) Field of Classification Search
CPC ...................................... H04M 3/16
See application file for complete search history.

(56) References Cited

U.S. PATENT DOCUMENTS

| | | | |
|---|---|---|---|
| 4,990,848 A | | 2/1991 | So |
| 5,168,519 A | * | 12/1992 | Scarinci et al. ............ 380/253 |
| 5,506,889 A | | 4/1996 | Gustafson et al. |
| 5,524,072 A | * | 6/1996 | Labaton et al. ............... 705/72 |
| 5,818,930 A | | 10/1998 | Mark |
| 5,889,851 A | | 3/1999 | Hsieh |
| 7,039,044 B1 | | 5/2006 | Whitfield et al. |
| 7,408,923 B1 | | 8/2008 | Khan et al. |
| 7,508,806 B1 | | 3/2009 | Shah et al. |
| 7,602,902 B2 | * | 10/2009 | Chen ............................ 379/386 |

(Continued)

FOREIGN PATENT DOCUMENTS

| | | |
|---|---|---|
| EP | 1994730 A2 | 11/2008 |
| JP | 4473936 B2 | 6/2010 |

(Continued)

OTHER PUBLICATIONS

International Preliminary Report on Patentability, including Written Opinion of the International Search Authority, PCT application: PCT/US2012/056411, ISA/RU, dated Feb. 18, 2013.

(Continued)

*Primary Examiner* — Joseph T Phan

(57) ABSTRACT

A system, method, and apparatus for processing confidential information. In one embodiment, the method includes: receiving confidential information on an incoming line coupled to the call center server; intercepting a DTMF tone portion of the confidential information at an encoder located between the incoming line and an agent at the remote client; and processing the DTMF tone at approximately the same time for two separate data paths, wherein a first path contains encoded confidential information for a call server, and a second path contains no confidential information for the agent.

33 Claims, 6 Drawing Sheets

(56) References Cited

U.S. PATENT DOCUMENTS

| | | |
|---|---|---|
| 8,135,381 B2 | 3/2012 | Ikeda et al. |
| 8,180,406 B2 | 5/2012 | Lim et al. |
| 8,204,447 B2 | 6/2012 | Hoffman |
| 8,249,965 B2 * | 8/2012 | Tumminaro ................ 705/35 |
| 8,254,404 B2 | 8/2012 | Rabenko et al. |
| 8,571,188 B2 * | 10/2013 | Gantman et al. ......... 379/90.01 |
| 8,750,471 B2 | 6/2014 | Tew et al. |
| 2007/0025331 A1 * | 2/2007 | Laurent et al. ............. 370/352 |
| 2010/0146366 A1 | 6/2010 | Hahm et al. |

FOREIGN PATENT DOCUMENTS

| | | |
|---|---|---|
| WO | 2008036914 A2 | 3/2008 |
| WO | 2009/136163 A2 | 11/2009 |

OTHER PUBLICATIONS

Extended European Search Report ("EESR") [supplementary European search report and the European search opinion], EPO for PCT/US2012056441, dated Apr. 28, 2015.

* cited by examiner

US 10,491,413 B2

SECURE PROCESSING OF CONFIDENTIAL INFORMATION ON A NETWORK

REFERENCE TO RELATED APPLICATIONS

This application claims priority to provisional application, U.S. Ser. No. 61/536,675, filed Sep. 20, 2011, entitled "Secure Remote Client Processing of Confidential Information," which application is also incorporated herein by its reference, in its entirety.

FIELD OF TECHNOLOGY

This disclosure relates generally to the technical field of networking, and in one example embodiment, this disclosure relates to a method, apparatus and system of secure data transactions on a network.

BACKGROUND

The communication of confidential and non-confidential information is used in many aspects of commerce, health and medical data, and data for personal, commercial, industrial, and national entities, and all levels there between. An increasing percentage of purchases are made online, or over the telephone, with payment effectuated by use of a credit or debit card number provided by the user, usually by a digital phone.

SSNs are also often requested by medical organizations and given over the phone along with other types of sensitive numeric data (CVV, expiry date, D.O.B., etc.). All of this sensitive information is typically stored along with all other personal details creating a huge exposure for identity theft or fraud. This sensitive information is frequently requested to be spoken over a call whereupon an operator/agent would note down the information of type it in to forms or fields. This method of transmitting sensitive information is highly prone to fraud, error, abuse and data loss or data theft. The agents themselves have access to all the sensitive information, the systems they are using could already be compromised and the data systems themselves are usually accessible to a large number of individuals.

The tone generated by a hard or soft pushbutton telephone is called a dual-tone multi-frequency (DTMF) signal. The two tones distinguish this signal from a normal human voice, which is a single tone.

The method described helps to address all of these shortcomings by never revealing the sensitive data to the agents and by allowing the automatic replacement of this data with harmless substitutes within the data systems themselves.

BRIEF DESCRIPTION OF THE VIEW OF DRAWINGS

Example embodiments are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

A method, apparatus and system for secure processing confidential information is disclosed. In the following description, for the purposes of explanation, numerous specific details are set forth in order to provide a thorough understanding of the various embodiments. It will be evident, however to one skilled in the art that various embodiments may be practiced without these specific details.

Figure 1A:
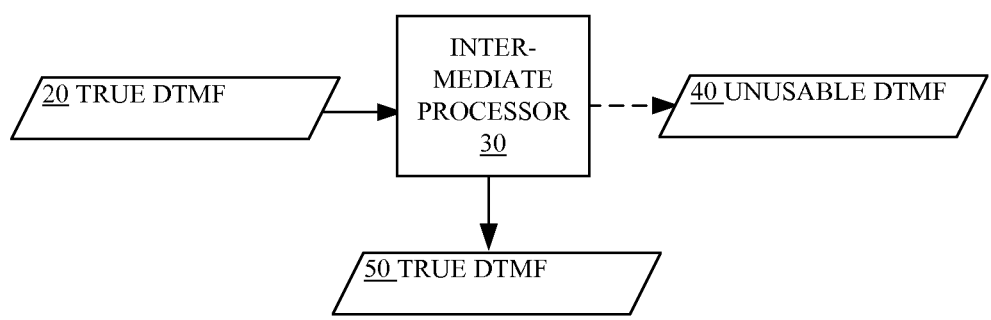
FIG. 1A is a functional block diagram illustrating the change of a confidential signal from a true DTMF tone to an unusable DTMF, according to one or more embodiments.

Referring to FIG. 1A, a functional block diagram 10 illustrating the change of a confidential signal from a true DTMF tone to an unusable DTMF, according to one or more embodiments. An intermediate processor function 30 renders a true dual-tone multi-frequency (DTMF) signal input to an unusable DTMF 40 by either removing the information content of the DTMF signal, e.g., flattening the signal so it is not recognizable, or by confounding the information content, e.g., by superimposing one or more other DTMF signals either random or a superset such as the twelve DTMF signals for a push button phone, or by simply removing or refraining from adding the DTMF signal to the output of the intermediate processor 30. By making the incoming DTMF unusable downstream of the intermediate processor 30, the present disclosure allows a first communication node, e.g., a user such as a customer, to enter personal confidential information, e.g., a credit card number, into a communication system in a safe and secure manner, for the purpose of purchasing goods and/or services from another party. Intermediate processor function 30 also provides the true DTMF signal as an output to a designated target, which is capable of handling the confidential signal securely. Furthermore, by ensuring this process is completed automatically, a good/services provider can manage reputation as well as reduce cost by removing elements of the purchase chain from the scope of mandatory payment card industry (PCI) compliance. The following figures will illustrate the timing, apparatus, system and method of effecting this function.

Referring to FIGS. 1B-1E are block diagrams of an alternative embodiments of a system for secure processing of confidential information, according to one or more embodiments. The following descriptions apply to all FIGS. 1B-1E. Thereafter, unique embodiments for each of the separate figures will be detailed under that figure denotation. The system 100-B includes at least a second communication node, e.g., receiver 101, and optionally a server 162, as either on-site or a third-party remote server farm, coupled to each other, both of which a company performing transactions in the network would own or have control. In particular, a company would control receiver 101, even if receiver 101 is distributed to agents for remote field use in for effecting sales with a caller via the communication network. In terms of controlling its functionality, the company would control and manage the identity, and registration of receiver 101 with entity 160, for purposes of maintaining security of the system and confidential information passed between the communicatively coupled blocks of: caller 110, exchange 120, receiver 101, entity 106 and company 162. The audio/visual input/output (A/V I/O) 150 of receiver 101 allows an agent associated therewith to communicate, verbally and optionally by text, with caller 110 to receive voice signal audio output from receiver 101, and to input customer information of caller 110, other than CBI, into an order system database, and to then direct the system to complete a transaction by secure payment using a balance of the system 100-B. Receiver 101, intermediate processor 130 and A/V I/O 150 can be a wide range of communication devices and systems with the ability to communicate with a caller 110 to effect a sale of goods or services to the caller 110, who is a customer. For example, receiver 101 can be a traditional twisted pair line in a private branch exchange (PBX), with intermediate processor 130 being the switching equipment therein, and the A/V I/O 150 being a plain old telephone system (POTS) with or without digital readout. Alternatively, receiver 101 can be an Internet protocol (VOIP) system with intermediate processor 130 being a router and/or switch, hub, etc., and with voice signal 150 being the individual lines and phones. In one more embodiment, receiver 101 can a personal communication device, e.g., a wireless mobile device such as a cell phone, smart phone, tablet, handheld, laptop, or any other electronic device with the ability to communicate voice signals.

Caller 110 is coupled to exchange 120 that can be a discrete physical location, or can be virtually located in the Internet, aka, 'the cloud.' Exchange 120 can be any communication interchange provided by a communication company such as a cell phone company, a landline company, an internet service provider, etc., and in one case is a phone switching office, a mobile telephone switching office, or the many devices that compose the Internet. Exchange 120 is coupled to receiver 101.

A caller initiating a call to another person or a company to conduct business, which invariable includes the exchange of confidential billing information (CBI) such as credit card, debit card, banking information, etc., or sharing of other confidential information, will provide this confidential information typically by depressing keys on their communication device, e.g., cell phone or push button telephone. The push buttons generate the DTMF signal, whether organically from their phone or from a code-activated remote source, that is typically transmitted over a separate channel than the voice signal, as shown by two separate connections between caller 110 and exchange 120. Regardless, the present disclosure is also well suited to providing secure processing of confidential information on a network for a single signal contained both voice signal and confidential (information) signal, e.g., in an encrypted format.

With the traditional case of separate channels, the confidential information signal, referred to as caller 110 DTMF (DTMF-C) 136 and the voice signal of the caller are communicated from caller 110 to exchange 120 to receiver 101. At receiver 101, the voice signal and the DTMF-C signal are processed by intermediate processor 130. The DTMF-C 136 signal input to intermediate processor 130 can be used, in appropriate configurations such as a PBX, to navigate a service of tone-driven user interactive menus (UIM), for the caller 110 to select the desired information, extension, department, service, goods, etc. Intermediate processor 130 also performs function 30 of FIG. 1A, of rendering the DTMF unusable, shown as DTMF-C (altered) 142, for downstream access by voice signal 150, whether by jack, speaker, etc. The DTMF-C altered 142 signal includes cases of providing no DTMF signal output whatsoever, or providing a confounded signal output that could not be used to determine the original input DTMF-C signal 136, with cases mentioned in FIG. 1A. This security function is provided on a full-time, continuous basis in the present embodiment, though another embodiment allows the company to disable it selectively, e.g., for performing security checks or audits.

The purpose of this disclosure is to prevent a listener of voice signal 150, e.g., a call-order agent, from having any access to the CBI of caller 110. While the call-order agent may have access to customer information such as name, address, etc., the call-order agent is segregated from the CBI, so that they have insufficient information for conducting any unauthorized purchases using the customer's CBI such as their credit card number. By not having access to the CBI, the agent is then always out of scope for purposes of Payment Card Industry Data Security Standard (PCI DSS). Consequently, the company or person utilizing this system and method will have a lower potential for conversion or misappropriation of caller confidential information, will have reduced costs from lower administrative oversight and PCI compliance duties, will enable remote home-agents to utilize the system with equal or greater security than on-site concentrated call centers and at lower cost, more flexible work force, localized service to callers, etc. Compared to other systems, where a listener/agent has to manually select a mode of disabling a DTMF-C signal from being passed to the agent, which still has the possibility for fraud and does not take the agent out of PCI scope, the present disclosure is guaranteed to not pass any caller confidential information to a listener/agent downstream of the intermediate processor, while still providing all the other expected services such as UIM and agent enabled communication of DTMF from her communication device to the intermediate processor and further downstream Entity 160 is a secure processing facility for handling, among other things, the CBI of caller 110, e.g., the DTMF-C 136 tones. Entity 160 can be a tokenization as a service (TAAS) entity, or some other entity, which could be managed by a third party either on-site or remotely by the third party, for providing the secured transactions in scope for PCI DSS. Entity 160 can be communicatively coupled to exchange 120, or to receiver 101 via some other route, medium, or protocol. e.g., via different versions of Layers 2 and 3 of the open standard interconnect (OSI). Subsequent figures provide explanations for alternative embodiments. Entity 160 provides a function of validating the agent who received the voice signal 150 and is working to complete a transaction with the caller 110. In particular, entity 160 compares the incoming call from the agent against a list of previously registered users. e.g., in a look up table on a computer memory, to verify that, based on a unique identifier code (UIC) of the call from the agent from receiver 101, that the agent/receiver 101 is a legitimate agent/receiver. The UIC can include unique identifiers of the agent/receiver 101 such as a media access control (MAC) address, an Internet protocol (IP) address, a subscriber identity module (SIM) card number from a personal communication device, or other similar unique identifiers. Once verified, entity 160 generates a token that is based on the receipt of the confidential information of the caller 110, received from receiver 101. Subsequent figures provide explanations for alternative embodiments of communicating between entity 160 and receiver 101 regarding communicating token information to receiver or to server 162.

Figure 1B:
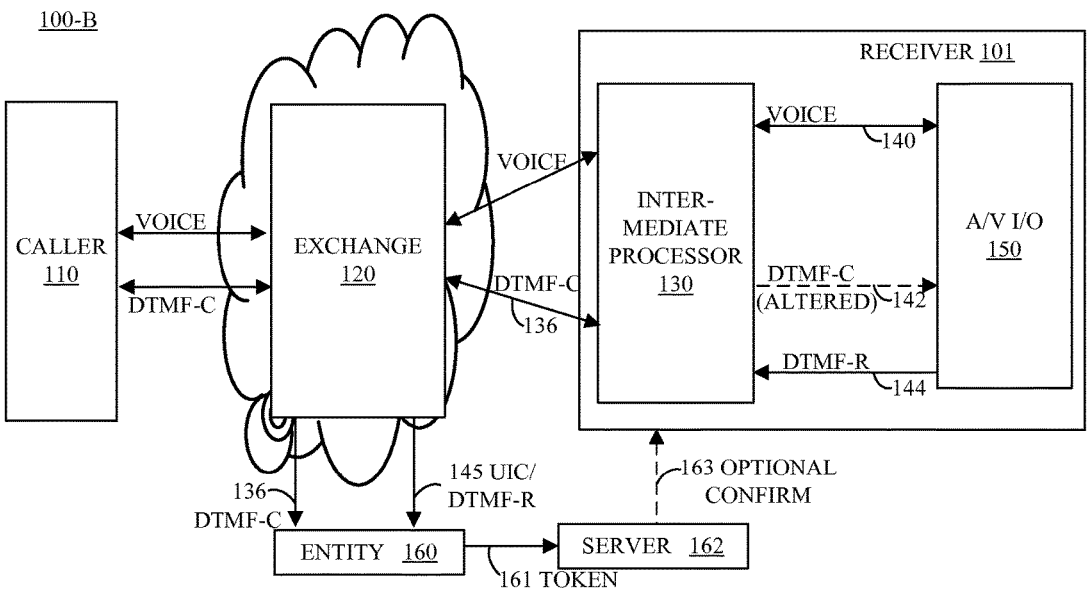
FIGS. 1B-1E are block diagrams of alternative embodiments of a system for secure processing of confidential information, according to one or more embodiments.

Referring now to FIG. 1B, exchange 120 is coupled to entity 160 to receive the DTMF-C 136 signal from the intermediate processor 130 which 'trombones' the signal back to the exchange 120 for routing to the entity 160, at the instruction of the receiver 101, which instantiates a secure channel from either intermediate processor 130 to exchange 120 and/or from exchange 120 to entity 160. Agent at receiver 101 can instantiate the secure channel by DTMF signal DTMF-R 144 from agent keypad (not shown) via A/V I/O 150, which is communicable to intermediate processor 130, and thereafter from exchange 120 to entity 160 as signal DTMF-R 145 which includes the UIC of the receiver 101. Thus, as shown, the DTMF signaling between intermediate processor 130 to A/V I/O 150 is asymmetric, allowing one-way communication from A/V I/O 150 to intermediate processor 130 and the non-communication, at least of caller DTMF-C 136 from intermediate processor 130 to A/V I/O 150. DTMF-C channel 136 from intermediate processor 130 to exchange 120 can include DTMF-R signal 144 from agent inputting instructions/data from a receiver 101 origination. Once token 161 is generated by entity 160, it is passed to server 162, which provides a minimal completion of the transaction re: the caller 110. Company of server 162 can then optionally provide a confirmation code 163 via any medium and format to user, e.g., typically by updating the sales order database that is being viewed by agent on a same device as receiver 101, or a separate device, e.g., a separate PC.

Figure 1C:
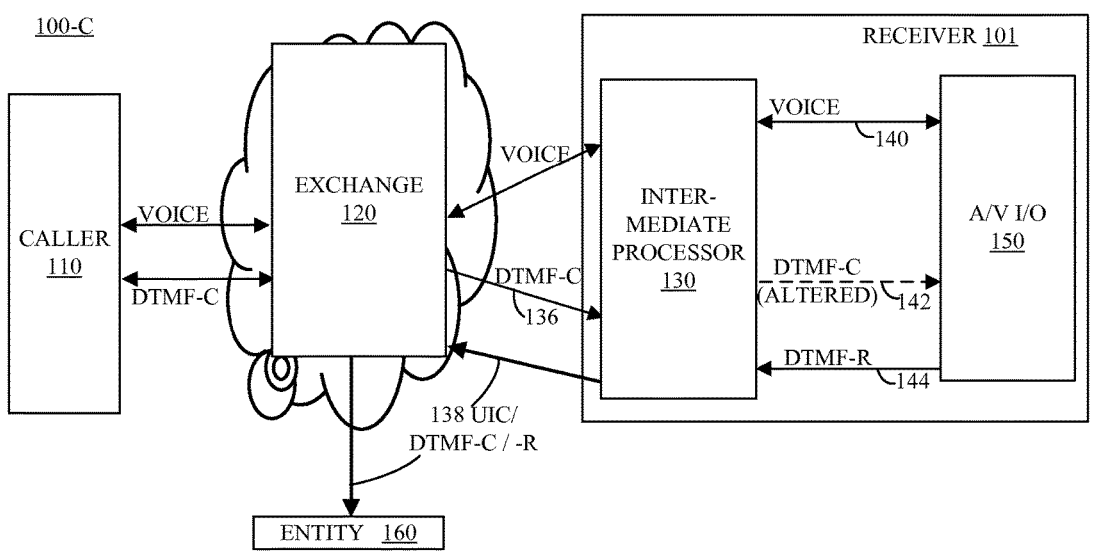

Referring now to FIG. 1C, an alternative embodiment is provided in that UIC DTMF-C-R 138 is provided by a secure channel for DTMF-C and for UIC/DTMF-R 144 that are encrypted as well. In addition, in the present figure, optional token generation and confirmation is not provided from entity 160, thus resulting in a blind transaction, e.g., without the handshake protocol that would otherwise close the loop as described with confirmation 163. Rather a tradition authorization or settlement statement is provided. The transaction is still closed, with the assumption that receipts and verifications will follow by either some other traditional means such as mail.

Figure 1D:
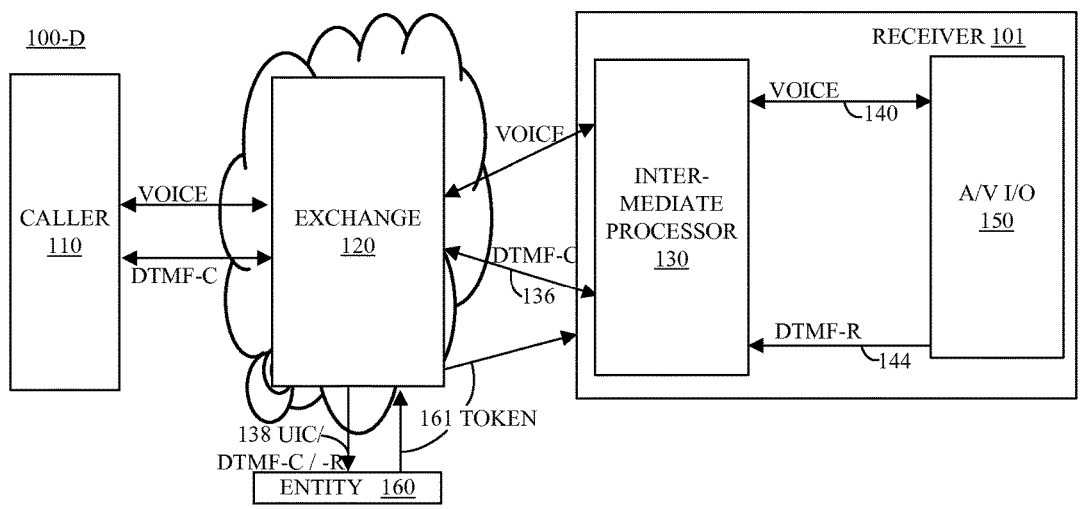
Figure 1E:
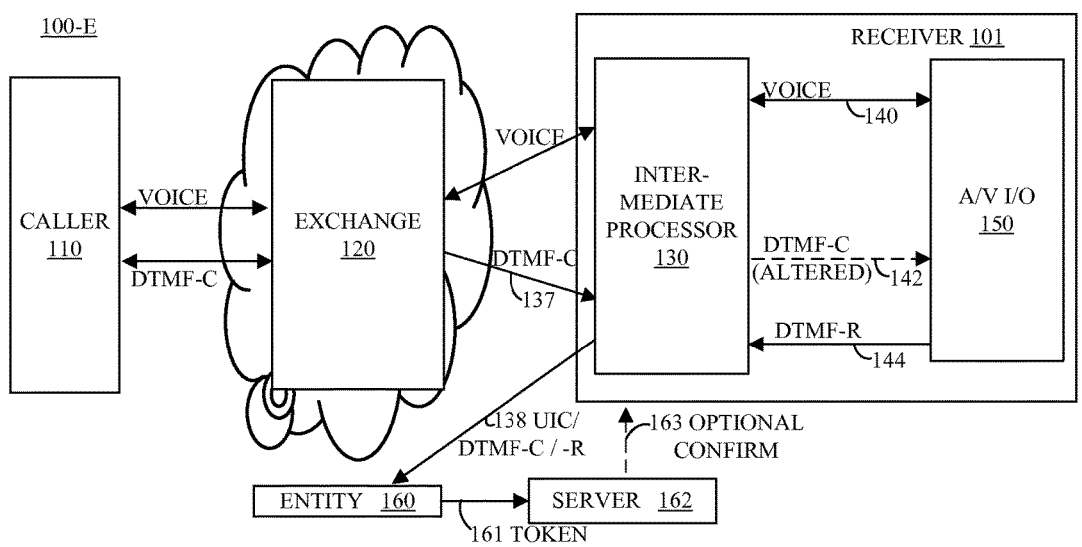

Referring now to FIG. 1D, the token 161 generated by entity 160 is not provided to a server, but rather is passed back via exchange 120 to receiver 101, e.g., for a single user or small office/home office agent that does not have a server dedicated to accept tokens. Referring now to FIG. 1E, the UIC/DTMF-C/-R 138 is provided by an alternative route/medium other than via the channel used by DTMF-C 137 communicated from exchange 120 to receiver 101. For example, different mediums can be chosen from a group comprising: twisted pair, optical, wireless cellular and wireless fidelity (Wi-Fi), etc. Furthermore, the protocols used for incoming DTMF-C 137 and outgoing 138 can be selected from a group comprising: TDMA, CDMA, GSM, SMS, WI-FI, OFDM, etc. e.g., different layers of the Open Systems Interconnect (OSI).

Figure 2:
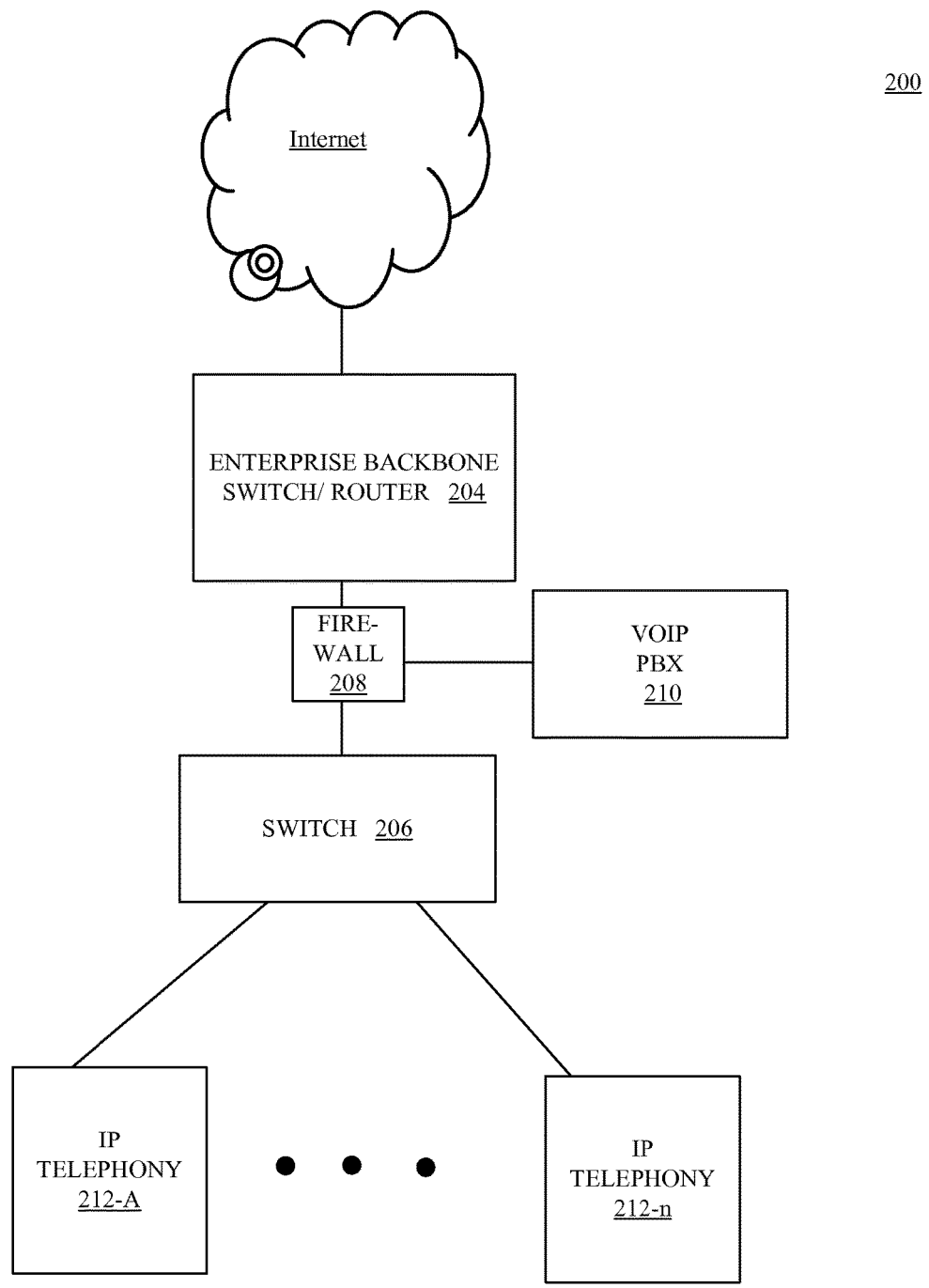
FIG. 2 is a block diagram of a VOIP phone system used in a communication system for secure processing of confidential information, according to one or more embodiments.

Referring to FIG. 2, a block diagram of a VOIP phone system 200 used in a communication system for secure processing of confidential information, according to one or more embodiments. Enterprise backbone switch/router 204 is coupled to the Internet and to switch 206 with the firewall 208 coupled therebetween. The firewall 208 is further coupled to VOIP PBX block 210 for providing the internal telephony functionality of routing calls, managing extensions, voicemail, etc. Firewall 208 functions to filter and eliminate all DTMF tones or signals destined for internal phones 212-A through 212-n routed via switch 206. Thus agents using internal phones 212-A through 212-n are also PCI compliant, per this arrangement.

Figure 3:
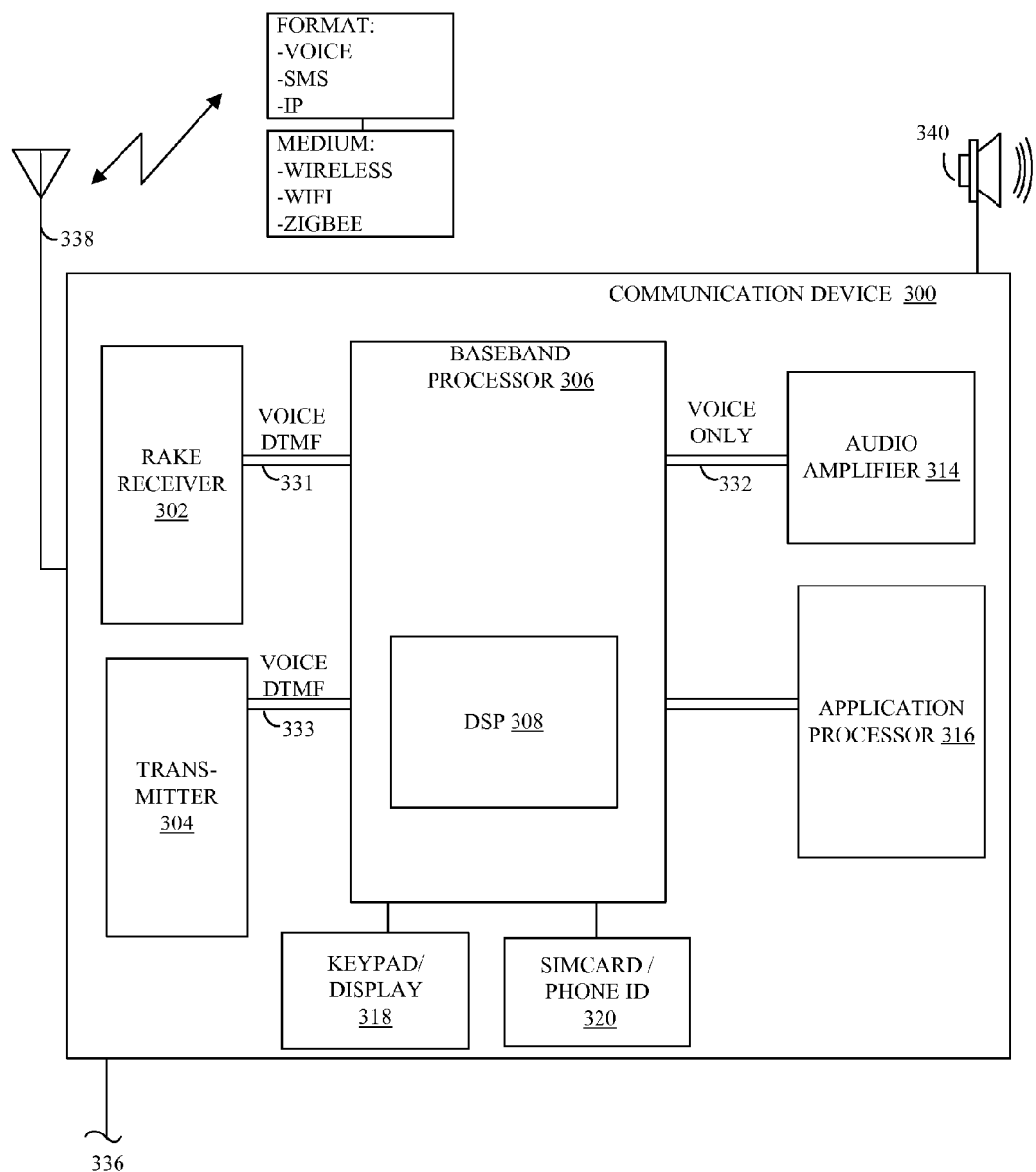
FIG. 3 is a block diagram of a personal communication phone system used in a communication system for secure processing of confidential information, according to one or more embodiments.

Referring to FIG. 3, a block diagram of a personal communication phone system used in a communication system for secure processing of confidential information, according to one or more embodiments. Personal communication device 300 includes a rake receive 302 to receive signals from antennae 338 and communicate both the voice and DTMF 331 to baseband processor 306 with digital signal processing (DSP) 308, which provide the CODEC/MODEM functions for signal processing. Alternatively one or more signals may be provided by wired connection 336, such as Ethernet, coaxial, or optical cable, etc. Baseband processor 306 is configured to provide only recognizable voice output 332 to audio amplifier 314, coupled thereto, in order to be compliant with not providing any incoming caller DTMF confidential information to the listener/agent of communication device 300. This can be implemented in one of multiple methods. First, if the DTMF confidential information is provided via a separate channel from voice data to device 300, then the baseband processor can be configured either permanently or selectively to not combine the demodulated and/or decoded signals from the DTMF confidential information signal with the voice signal. If selectively done, then an application processor or other means could be programmed to allow only a company or person with administrative authorization to change. Alternatively, the application processor can contain authorization and password protected software that configures the baseband processor to perform alternative techniques to render the DTMF tones unusable as previously described, such as tone flattening, superposition of random or superset of tones, etc. SIMcard/caller identification block 320 provides the identification features used by entity 160 of FIG. 1B-1E, via transmitter 304 and antennae 338 or cable 336, to verify the identity of the agent providing the service for the caller. Keypad/display 318 coupled to baseband processor and application processor allows the agent/user of device 300 to input data and instructions to configure the system, open secure channel for completing the transaction.

Figure 4:
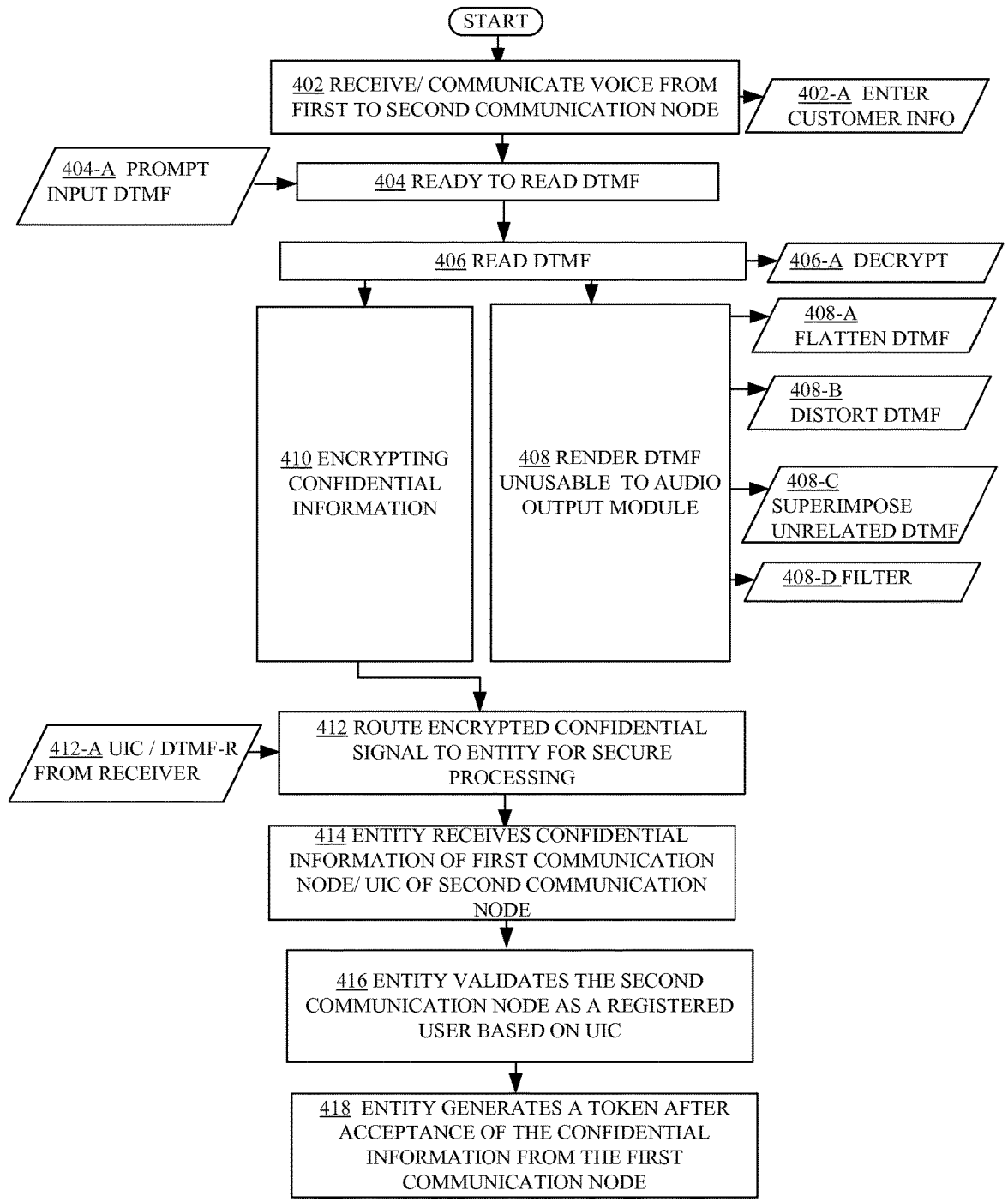
FIG. 4 is a flowchart of a method for secure processing of confidential information in a communication system, according to one or more embodiments.

Referring to FIG. 4, a flowchart of a method for secure processing of confidential information in a communication system, according to one or more embodiments. In operation 402, a voice signal is received and communicated from the first communication node, e.g., a caller into the system to place an order, to a second communication node, e.g., an agent who assists the caller in placing the order. In operation 402-A an output of customer information is provided by agent into a database.

In operation 404, a ready to read DTMF signal is indicated either by the agent or an automated notice/message from the second communication node per 404-A. At this point, a secure channel can be instantiated to allow the confidential billing information, e.g., the DTMF tones of a credit card, to be communicated to an entity, e.g., the TAAS block. At operation 406, the DTMF is read by the second communication node, e.g., the receiver 101, as input from the user/first communication node. An optional operation output of decrypting 406-A is used in the case of an encrypted VOIP system, such as Skype®. In operation 408 the DTMF is rendered unusable to an A/V I/O, or audio output module per the means previously described and shown as flattening 408-A, distorting the DTMF 408-B, superimposing unrelated DTMF 408-C, filtering DTMF 408-D, and similar means. IN parallel with operation 408, operation 410 performs encrypting of the confidential information DTMF tones, and via step 412, routes the encrypted confidential signal for secure processing at an entity handling, e.g., TAAS block. Along with step 412, is included the UIC and any DTMF-R input 412-A from the second communication node. In operation 414, the entity receives the confidential information from the first communication node and UIC of the second communication node, and thereafter in step 416 validates the second communication node as a registered user, if the UIC matches its database of registered users. The confidential information of the first communication node is then captured by the entity, and a token is optionally generated for systems designing in the token, but other systems will use a blind transaction without a token.

Applications

References to methods, operations, processes, systems, and apparatuses disclosed herein that are implementable in any means for achieving various aspects, and may be executed in a form of a machine-readable medium, e.g., computer readable medium, embodying a set of instructions that, when executed by a machine such as a processor in a computer, server, etc. cause the machine to perform any of the operations or functions disclosed herein. Functions or operations may include receiving, intercepting, processing, encoding, decoding, transmitting, converting, communicating, transforming, synchronizing, calculating, terminating, compiling, associating, and the like.

The term "machine-readable" medium includes any medium that is capable of storing, encoding, and/or carrying a set of instructions for execution by the computer or machine and that causes the computer or machine to perform any one or more of the methodologies of the various embodiments. The "machine-readable medium" shall accordingly be taken to include, but not limited to, solid-state memories, optical and magnetic media, compact disc and any other storage device that can retain or store the instructions and information, e.g., only non-transitory tangible medium. The present disclosure is capable of implementing methods and processes described herein using transitory signals as well, e.g., electrical, optical, and other signals in any format and protocol that convey the instructions, algorithms, etc. to implement the present processes and methods.

Exemplary computing systems, such as a personal computer, minicomputer, mainframe, server, etc. that are capable of executing instructions to accomplish any of the functions described herein include components such as a processor, e.g., single or multi-processor core, for processing data and instructions, coupled to memory for storing information, data, and instructions, where the memory can be computer usable volatile memory, e.g. random access memory (RAM), and/or computer usable non-volatile memory, e.g. read only memory (ROM), and/or data storage, e.g., a magnetic or optical disk and disk drive). Computing system also includes optional inputs, such as alphanumeric input device including alphanumeric and function keys, or cursor control device for communicating user input information and command selections to processor, an optional display device coupled to bus for displaying information, an optional input/output (I/O) device for coupling system with external entities, such as a modem for enabling wired or wireless communications between system and an external network such as, but not limited to, the Internet. Coupling of components can be accomplished by any method that communicates information, e.g., wired or wireless connections, electrical or optical, address/data bus or lines, etc.

The computing system is only one example of a suitable computing environment and is not intended to suggest any limitation as to the scope of use or functionality of the present technology. Neither should the computing environment be interpreted as having any dependency or requirement relating to any one or combination of components illustrated in the exemplary computing system. The present technology may be described in the general context of computer-executable instructions, such as program modules, being executed by a computer. Generally, program modules include routines, programs, objects, components, data structures, etc., that perform particular tasks or implement particular abstract data types. The present technology may also be practiced in distributed computing environments where tasks are performed by remote processing devices that are linked through a communications network. In a distributed computing environment, program modules may be located in both local and remote computer-storage media including memory-storage devices.

The present disclosure is applicable to any type of network including the Internet, an intranet, and other networks such as local are network (LAN); home area network (HAN), virtual private network (VPN), campus area network (CAN), metropolitan area network (MAN), wide area network (WAN), backbone network (BN), global area network (GAN), or an interplanetary Internet. Communication media in the system can include wired, optical, wireless and other communication systems, e.g., voice over internet protocol (VOIP) that conveys data.

Methods and operations described herein can be in different sequences than the exemplary ones described herein, e.g., in a different order. Thus, one or more additional new operations may be inserted within the existing operations or one or more operations may be abbreviated or eliminated, according to a given application, so long as substantially the same function, way and result is obtained.

Although the present embodiments have been described with reference to specific example embodiments, it will be evident that various modifications and changes may be made to these embodiments without departing from the broader spirit and scope of the various embodiments.

For example, the various devices, modules, encoders, decoders, receivers, transmitters, servers, wireless devices, internal commutation systems, computers, etc. described herein may be enabled and operated using hardware circuitry (e.g., CMOS based logic circuitry), firmware, software and/or any combination of hardware, firmware, and/or software (e.g., embodied in a machine readable medium). Similarly, the modules disclosed herein may be enabled using software programming techniques. For example, the various electrical structure and methods may be embodied using transistors, logic gates, and electrical circuits (e.g., application specific integrated ASIC circuitry and/or in Digital Signal; Processor DSP circuitry).

The foregoing descriptions of specific embodiments of the present disclosure have been presented for purposes of illustration and description. They are not intended to be exhaustive or to limit the invention to the precise forms disclosed. Many modifications and variations are possible in light of the above teaching without departing from the broader spirit and scope of the various embodiments. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

I claim:

1. A system for communicating with a voice signal and a confidential signal, the system comprising:

a receiver coupled to a network for communicating the voice signal and the confidential signal on separate channels with a first communication node, the receiver comprising:
  an intermediate processor that processes the voice signal and the confidential signal received on the separate channels; and
  an audio/visual output module coupled to the intermediate processor, the audio/visual output module for communicating with the first communication node; and wherein:
    the intermediate processor of the receiver is configured to receive the voice signal and the confidential signal;
    the intermediate processor communicates the voice signal to the audio/visual output module;
    the intermediate processor continuously renders the confidential signal unusable to the audio/visual output module;
    the intermediate processor does not combine the voice signal and the confidential signal; and
    the intermediate processor renders the confidential signal unusable by performing a signal processing operation on the confidential signal using at least one of: flattening one or more DTMF tones in the confidential signal, superimposing noise on the one or more DTMF tones in the confidential signal, superimposing one or more additional DTMF tones in the confidential signal, superimposing all standard DTMF tones on the confidential signal, superimposing one or more random DTMF tones in the confidential signal, filtering out the DTMF tones from the confidential signal, or refraining from communicating the DTMF tones to the audio/visual output module.

2. The system of claim 1 wherein the confidential signal received is a dual tone multiple frequency (DTMF) signal.

3. The system of claim 1 wherein the system does not require an input to prevent the system from communicating the confidential signal to a second communication node.

4. The system of claim 1 wherein the receiver is always out of scope for Payment Card Industry Data Security Standard (PCI DSS).

5. The system of claim 1 wherein the intermediate processor is a voice over internet protocol (VOIP) system comprising:
  a router for routing incoming signals;
  an optional switch coupled to the router; and
  a filter coupled to the router at a location that is upstream from the audio/visual output module, wherein the filter renders the confidential signal unusable to the audio/visual output module.

6. The system of claim 1 wherein the intermediate processor is a processor of a personal communication device.

7. The system of claim 1 wherein:
  a protocol used for transmitting the voice signal and the confidential signal from the first communication node is an encrypted protocol; and
  the intermediate processor, after initiation of a decryption operation, renders one or more DTMF tones in the confidential signal unusable to the audio/visual output module.

8. The system of claim 1 further comprising:
  an entity coupled to the second communication node; and wherein:
    the intermediate processor is configured to encrypt the confidential signal and route the encrypted confidential signal from the intermediate processor to the entity for secure processing; and
    the entity is external to the first communication node and external to the receiver.

9. The system of claim 1 wherein the intermediate processor is configured to route the confidential signal, from the intermediate processor to an entity for receiving payment.

10. The system of claim 1 wherein a tone driven user interactive menu in the receiver is configured to interpret a DTMF tone of the confidential signal for selecting a service for the first communication node.

11. The system of claim 10 wherein the intermediate processor is further configured to accept DTMF tones from the second communication node for selecting options from the tone from the tone driven user interactive menu.

12. The system of claim 11 wherein the system is further configured to instantiate a secure channel to an entity, in response to the DTMF tones from the second communication node, for transmitting the confidential signal to the entity.

13. A system for communicating with a voice signal and a confidential signal, the system comprising:
  a receiver coupled to a network for communicating the voice signal and the confidential signal on separate channels with a first communication node, the receiver comprising:
    an intermediate processor that processes the voice signal and the confidential signal received on the separate channels; and
    an audio/visual output module coupled to the intermediate processor, the audio/visual output module for communicating with the first communication node; and wherein:
      the intermediate processor of the receiver is configured to receive the voice signal and the confidential signal;
      the intermediate processor communicates the voice signal to the audio/visual output module;
      the intermediate processor continuously renders the confidential signal unusable to the audio/visual output module;
      the intermediate processor does not combine the voice signal and the confidential signal;
      the first communication node transmits customer information to a second communication node through the voice signal;
      an entity coupled to the second communication node is configured to validate the second communication node based on a unique identifier code (UIC) of the second communication node; and
      the entity is further configured to generate a token and transmit the token to the receiver, the token based on a verified receipt of the confidential signal from the first communication node at the entity.

14. The system of claim 13 wherein the confidential signal received is a dual tone multiple frequency (DTMF) signal.

15. The system of claim 13 wherein the system does not require an input to prevent the system from communicating the confidential signal to the second communication node.

16. The system of claim 13 wherein the receiver is always out of scope for Payment Card Industry Data Security Standard (PCI DSS).

17. The system of claim 13 wherein the intermediate processor is a voice over internet protocol (VOIP) system comprising:
  a router for routing incoming signals;

an optional switch coupled to the router; and
a filter coupled to the router at a location that is upstream from the audio/visual output module, wherein the filter renders the confidential signal unusable to the audio/visual output module.

18. The system of claim 13 wherein the intermediate processor is a processor of a personal communication device.

19. The system of claim 13 wherein:
a protocol used for transmitting the voice signal and the confidential signal from the first communication node is an encrypted protocol; and
the intermediate processor, after initiation of a decryption operation, renders one or more DTMF tones in the confidential signal unusable to the audio/visual output module.

20. The system of claim 13, wherein:
the intermediate processor is configured to encrypt the confidential signal and route the encrypted confidential signal from the intermediate processor to the entity for secure processing; and
the entity is external to the first communication node and external to the receiver.

21. The system of claim 13 wherein the intermediate processor is configured to route the confidential signal, from the intermediate processor to the entity for receiving payment.

22. The system of claim 13 wherein a tone driven user interactive menu in the receiver is configured to interpret a DTMF tone of the confidential signal for selecting a service for the first communication node.

23. The system of claim 22 wherein the intermediate processor is further configured to accept DTMF tones from the second communication node for selecting options from the tone driven user interactive menu.

24. The system of claim 23 wherein the system is further configured to instantiate a secure channel to the entity, in response to the DTMF tones from the second communication node, for transmitting the confidential signal to the entity.

25. The system of claim 13 wherein:
the intermediate processor renders the confidential signal unusable by performing a signal processing operation on the confidential signal using at least one of:
flattening one or more DTMF tones in the confidential signal, superimposing noise on the one or more DTMF tones in the confidential signal, superimposing one or more additional DTMF tones in the confidential signal, superimposing all standard DTMF tones on the confidential signal, superimposing one or more random DTMF tones in the confidential signal, filtering out the DTMF tones in the confidential signal, or refraining from communicating the DTMF tones to the audio/visual output module.

26. A receiver for communicating with a first communication node via a network, the receiver comprising:
an intermediate processor that receives and processes a voice signal and a confidential signal from the first communication node; and
an audio/visual output module coupled to the intermediate processor, the audio/visual output module for amplifying the voice signal for a second communication node to communicate with the first communication node; and wherein:
the intermediate processor of the receiver is configured to receive the voice signal and the confidential signal of the first communication node;
the intermediate processor communicates the voice signal to the audio/visual output module for the second communication node;
the intermediate processor continuously renders the confidential signal unusable to the audio/visual output module;
the receiver communicates the voice signal and the confidential signal on separate channels with the first communication node; and
the intermediate processor renders the confidential signal unusable by performing a signal processing operation on the confidential signal using at least one of: flattening one or more DTMF tones in the confidential signal, superimposing noise on the one or more DTMF tones in the confidential signal, superimposing one or more additional DTMF tones in the confidential signal, superimposing all standard DTMF tones on the confidential signal, superimposing one or more random DTMF tones in the confidential signal, filtering out the DTMF tones in the confidential signal, or refraining from communicating the DTMF tones to the audio/visual output module.

27. The receiver of claim 26 wherein the system does not require an input to prevent the system from communicating the confidential signal to the audio/visual output module of the second communication node.

28. The receiver of claim 26 wherein the receiver is always out of scope for Payment Card Industry Data Security Standard (PCI DSS).

29. The receiver of claim 26 wherein the intermediate processor is a voice over internet protocol (VOIP) system comprising:
a router for routing incoming signals;
an optional switch coupled to the router; and
a filter coupled to the router at a location that is upstream from the audio/visual output module, wherein the filter renders the confidential signal provided to the audio/visual output module unusable.

30. The receiver of claim 26 further comprising:
an entity coupled to the second communication node; and wherein:
the intermediate processor is configured to encrypt the confidential signal and route the encrypted confidential signal from the intermediate processor to the entity for secure processing; and
the entity is external to the first communication node and external to the receiver.

31. The receiver of claim 26 wherein the intermediate processor is configured to route the confidential signal, from the intermediate processor to an entity for receiving payment.

32. The receiver of claim 26 wherein a tone driven user interactive menu in the intermediate processor of the receiver is configured to interpret a DTMF tone of the confidential signal in order to route the first communication node to a service desired by the first communication node.

33. The receiver of claim 26 wherein the receiver is further configured to instantiate a secure channel to the entity, in response to the DTMF tones from the second communication node, for transmitting the confidential signal to the entity.

* * * * *